Oct. 27, 1936.　　　D. M. FEGAN　　　2,058,581
MEANS FOR ENABLING MOVEMENT OF FIGURES IN STILL SLIDE SCREEN PROJECTIONS
Filed March 28, 1935　　　2 Sheets-Sheet 1

INVENTOR
DUDLEY MILBANK FEGAN
By Emil Bönnelycke
ATTORNEY

Oct. 27, 1936.　　　D. M. FEGAN　　　2,058,581
MEANS FOR ENABLING MOVEMENT OF FIGURES IN STILL SLIDE SCREEN PROJECTIONS
Filed March 28, 1935　　　2 Sheets-Sheet 2

INVENTOR
DUDLEY MILBANK FEGAN
BY Emil Bönnelycke
ATTORNEY

Patented Oct. 27, 1936

2,058,581

UNITED STATES PATENT OFFICE 2,058,581

MEANS FOR ENABLING MOVEMENT OF FIGURES IN STILL SLIDE SCREEN PROJECTIONS

Dudley Milbank Fegan, Brisbane, Queensland, Australia, assignor to Animated Slides Limited, Canberra Federal Capital Territory, Australia, a company of Australia Application March 28, 1935, Serial No. 13,565
In Australia July 9, 1934

7 Claims. (Cl. 88—26)

This invention relates to means for enabling movement of figures or devices in still slide screen projections.

At present it is usual in picture theatres and other such places to project still slides upon a screen to display advertisements and announcements. There is no movement except the change from one slide to another which allows the interest of the public in the advertisements and the like to wane.

The object of this invention is to provide means whereby a certain amount of movement of a figure or figures or objects or portions thereof in a screen display may be had without to any extent altering the existing projector lantern or apparatus.

According to this invention a slide has two different attitudes of a person or other figure (for example two attitudes of walking) drawn or otherwise made by alternate full or dotted lines so that alternately the lines of one attitude will register with opaque lines and the other attitude will register with a transparency in a moving endless band, slide or disc adapted to pass in front of or behind the said slide in the slide carrier. The endless band or the like may be provided with opaque sections at each side of the alternate opaque and transparent lines, so that while travelling will bring in and block out the moving figure caused by the opaque and transparent lines of the screen passing across the vertical opaque and transparent lines of the figure upon the slide which is still. Vertical lines although mentioned are not essential. The lines may be other than vertical but those in the slide when two or three distinct attitudes are shown must register with those in the screen. When a continuous movement such, as smoke, fire, water, clouds or the like is desired the vertical lines of the screen pass across lines on the slide drawn other than vertical, the effect being a continuous movement without the action being terminated and recommenced.

Furthermore, the slide may move across the screen, a reciprocating motion of the slide across the screen or vice versa may be used, or a vertical or oblique movement of the slide relative to the screen may be employed, the lines upon both being parallel or approximately so. The lines upon the screen may be of greater thickness than those of the slide enabling a three series motion in lieu of the two series motion before described.

The invention will now be described with reference to the accompanying drawings of pictorial views, wherein:—

Figure 1:
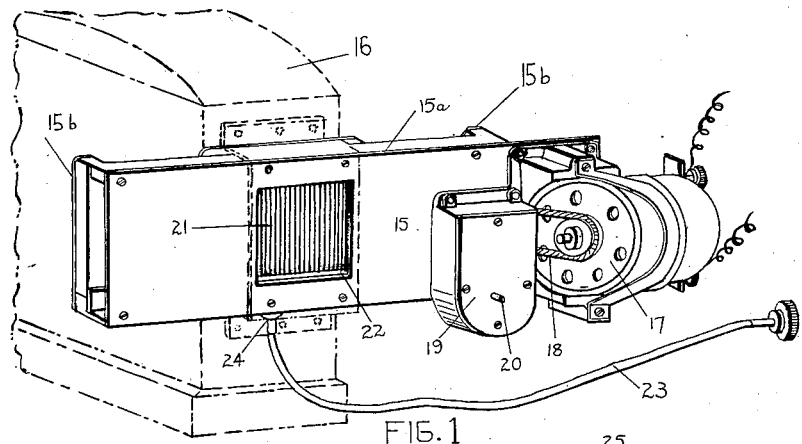
Figure 1 illustrates complete apparatus for carrying the invention into effect, said apparatus being in juxtaposition with a standard projector shown in chain dotted lines.

Referring to Figure 1, a screen carrier 15 (see Figure 2) is suitably mounted in position before a projector 16 in the usual manner. Upon this screen carrier 15 is secured a motor 17 driving by means of a belt 18 a reduction gear housed in casing 19 in which spindle 20 conveys movement to a gear wheel 31 (Figure 2) which in turn transmits movement to the screen 21 (Figure 7) movably mounted in screen carrier 15. An aperture 22 is provided in screen carrier 15 in front of the said projector 16, and a flexible shaft 23 is suitably adapted to operate a screwed pin passing through a threaded adaptor 24 upon the bottom edge of the slide carrier 15.

Figure 6:
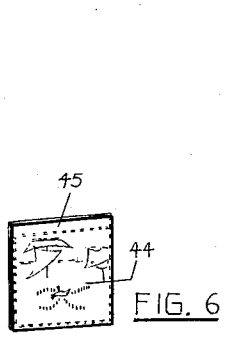
Figure 6 shows a slide as it would appear when placed in the carrier.
Figure 7:
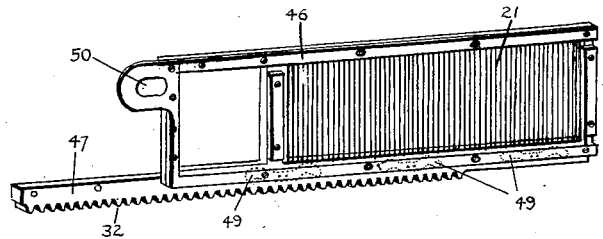
Figure 7 is a view of the screen mounted in its frame.

This screen carrier 15 (Figures 2 and 3) consists of front and back plates 15a and 15b which have apertures 22a and 22b. Guide bars 25 and 26 are mounted at the top and bottom to carry the screen 21 (Figure 7) and slide carrier 27 (Figure 5). The vertical bar 28 at the end of carrier 15 forms a stop for the slide carrier and springs 29 and 30 on front plate 15a firmly hold the screen 21. Gear wheel 31 upon the rear end of spindle 20 (Figure 1), which spindle passes through plate 15a, engages rack 47 (Figure 7). A hole 33 in the base of slide 26 (Figure 2) accommodates the screwed pin on the end of flexible shaft 23. The back plate 15b is provided with springs 34 and 35 adapted to maintain the slide carrier 27 in position, and gaps 36 facilitate the handling of slides (Figure 6) while slots 37 take binding screws of end bar 39 which has a hole 40 adapted to allow push rod 41 of slide carrier 27 to move freely.

The slide carrier 27 has outside guides 42 and centre guide 43 to accommodate slide 44. Push rod 41 is screwed into slide carrier 27 and slide 44 is mounted upon a sheet of plain glass 45 enabling the slide 44 to be kept in close contact with screen 21.

Figure 2:
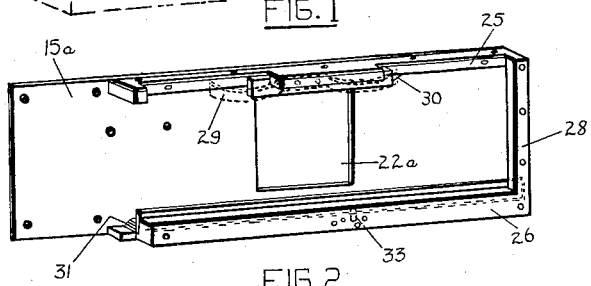
Figure 2 is a view looking at the back of the screen carrier.

Screen 21 is mounted in frame 46 which slides freely between guide bars 25 and 26 of carrier 15 (Figure 2). The rack bar 47 is mounted upon the bottom of frame 46 and has teeth 32 meshing with pinion 31 (Figure 2). Springs 49 maintain the frame 46 firmly in carrier 15 and the lug 50 on frame 46 facilitates the removal of frame 46 from carrier 15.

The screen 21 consists of a strip of celluloid, glass or other transparent material upon which is placed series of vertical opaque lines as before described, or alternatively an opaque substance may be cut or slotted.

Figure 8:
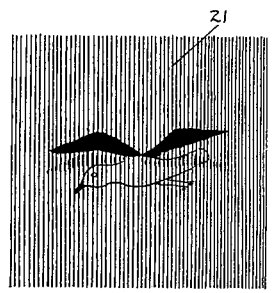
Figures 8 and 9 illustrate two attitudes of a bird when alternate series of opaque lines are positioned behind the opaque lines of the screen.
Figure 9:
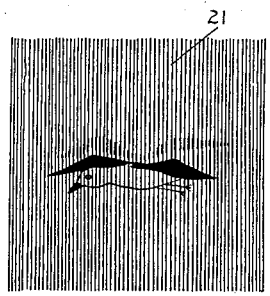
Figure 10:
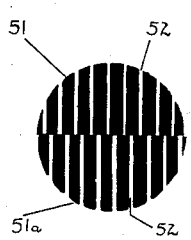
Figure 10 is a view of a circle shown upon a plate in accordance with this invention.
Figure 11:
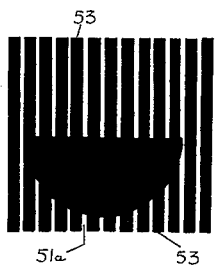
Figures 11 and 12 are views of the plate (Figure 10) shown behind two screens wherein alternate series of lines on the plate or slide are in register with the opaques of the screens.
Figure 12:
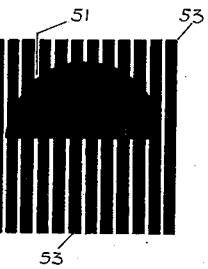

Referring to Figure 10; the complete circle is formed of opaque parallel lines 51 and 51a on a transparent background 52, while in Figures 11 and 12 these opaque lines 51 and 51a are shown in relative positions behind the opaque lines 53 of screen 21, the effect in the case of Figure 11 being that the opaque lines 51 in the upper half of the circle (Figure 10) are obliterated by opaque lines 53 of the screen 21 while the lower opaque lines 51a position themselves between the opaque lines 53 of screen 21 and form a full semicircle. The effect in the case of Figure 12 is the converse. Therefore it will be seen in Figure 8 wherein the device of a bird is shown that the opaque lines forming the upper attitude of the wings are interposed between the opaque lines of screen 21, and the opaque lines forming the lower attitude of the wings are obliterated by the opaque lines of screen 21. Conversely in Figure 9 (when the screen has been moved a step) the opaque lines of the slide forming the upper attitude of the wings are obliterated and the opaque lines forming the lower attitude of the wings are interposed between the opaque lines of screen 21. In Figures 8 and 9 the obliterated attitudes of the wings are made visible for illustration, but in practice would not be observed.

Figure 13:
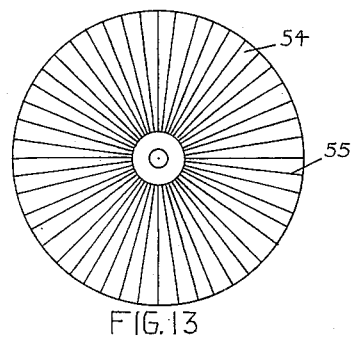
Figure 13 illustrates a disc with radial lines for use as a screen.
Figure 14:
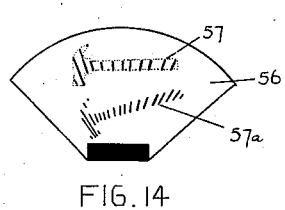
Figure 14 shows a view of a slide suitable for registering with the screen of Figure 13 to produce alternate raising and lowering of a hammer as the screen moves step by step across the plate.

In a modification a transparent disc 54 (Figure 13) has a series of opaque radial lines 55 for use in conjunction with a disc or slide 56 (Figure 14) upon which alternate series of opaque radial lines 57 or approximately radial lines 57 and 57a form two attitudes of figures as before described. Actually a hammer in raised attitude and in the attitude of striking a block is shown which attitudes individually would be assumed by the relation of the screen 54 to the still slide 56.

Figures 3, 4:
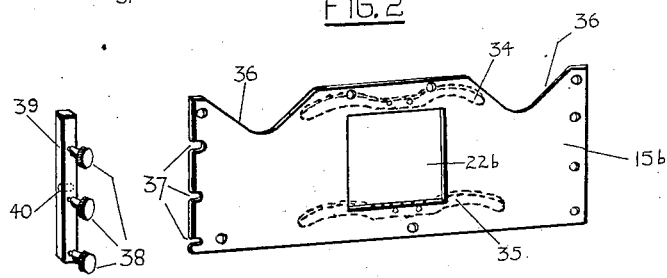
Figure 3 is a view of the cover plate taken from the screen carrier (Figure 2)
Figure 4 is a view of the removable end bar which forms a guide for the push rod of the slide carrier.
Figure 5:
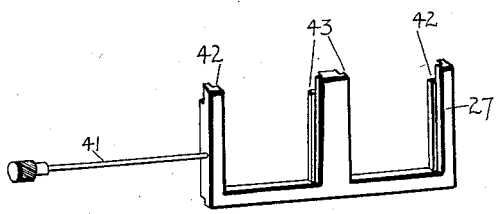
Figure 5 is a view of a standard slide carrier adapted to take the special slides of the invention.

In use to convert the apparatus from the usual still slide to that according to this invention the ordinary slide carrier is withdrawn by loosening screws 38 and removing end bar 39 (Figure 4). Screwed pin at the end of flexible shaft 23 passing through adaptor 24 is unscrewed to a position clear of the guide 26 of carrier 15. Screen 21 in frame 46 is inserted between guides 25 and 26 of carrier 15 and lifted up sufficiently to enable teeth 32 on rack bar 47 to clear the teeth of pinion 31 and is moved forward into position by lug 50. Upon releasing frame 46 springs 30 depress frame 46 and bring teeth 32 on rack bar 47 into mesh with the teeth of pinion 31. Push rod 41 is unscrewed from the standard slide carrier and pushed through hole 40 in end bar 39 and is screwed into slide carrier 27 which latter is then inserted between guides 25 and 26 of carrier 15. End bar 39 is replaced and held in position by tightening screws 38 in slots 37. The screen carrier 15 is now inserted in position in front of projector 16. Slide 44 is inserted between guides 42 and 43 of slide carrier 27 which is pushed into position before aperture 22 in carrier 15.

Assuming illumination to be provided in projector 16 and the figure to be thrown upon the theatre screen, adjustment of movable screen 21 relative to still slide 44 may be had by screwing the flexible shaft 23 thus raising one end of frame 44. The motor 17 is started which causes screen 21 to be moved at a predetermined speed across slide 44 thereby alternately obliterating and exposing each series of opaque lines upon the slide thus forming alternate attitudes. When the last tooth 32 on rack bar 47 disengages pinion 31 no further movement takes place until a reverse motion is applied.

I claim:

1. Means for enabling movement of figures in still slide screen projectors, comprising a screen carrier positioned before a projector, and having apertures, a transparent screen having opaque parallel lines, a toothed rack mounted on said screen, a motor and reduction gear mounted upon said screen carrier, a pinion in said reduction gear meshing with said toothed rack upon the screen for imparting motion thereto before the apertures, a slide carrier within the screen carrier adapted to be positioned between the apertures, and a transparent slide having parallel opaque lines or portions of lines adapted to register with the parallel lines of the screen, said lines or portions of lines being in two alternate series to form alternately two different attitudes of the figure displayed as respective series interpose or obliterate themselves between or behind the lines of the screen.

2. In apparatus for enabling movement of figures in still slide screen projections as claimed in claim 1, means for bringing the respective lines of the screen and slide into register consisting of a threaded pin adapted to raise one end of the screen, and a flexible shaft for turning said threaded pin.

3. In apparatus for enabling movement of figures in still slide screen projections as claimed in claim 1, means for holding the slide carrier firmly consisting of springs secured to the back plate of the screen carrier and bearing against said slide carrier.

4. In apparatus for enabling movement of figures in still slide screen projections as claimed in claim 1, means for holding the screen in position against the slide consisting of springs secured to the front plate and top of the screen carrier.

5. In apparatus for enabling movement of figures in still slide screen projections as claimed in claim 1, means for closely contacting the slide and screen during movement of the latter, consisting of a transparent plate secured to the slide.

6. In apparatus of the character described, a slide having two series of image-projecting parallel spaced lines, each series representing a figure in different positions of movement, a screen having a plurality of image-projecting parallel spaced lines parallel to the lines on said slide, the lines on said screen and slide being of equal width and spaced apart a distance equal to said width whereby, upon moving the screen across the slide, the lines on the screen will alternately register with the lines and spaces between the lines of the two series of lines on the slide, means for supporting said slide and screen before a projection apparatus, a toothed rack on said screen, a pinion carried by said supporting means and meshing with said rack, and means for rotating said pinion to move said screen across said slide.

7. In apparatus of the character described, a slide having two series of image-projecting parallel spaced lines, each series representing a figure in different positions of movement, a screen having a plurality of image-projecting parallel spaced lines parallel to the lines on said slide, the lines on said screen and slide being of equal width and spaced apart a distance equal to said width whereby, upon moving the screen across the slide, the lines on the screen will alternately register with the lines and spaces between the lines of the two series of lines on the slide, means for supporting said slide and screen before a projection apparatus, means for moving said screen relative to said slide and supporting means, and means for adjusting the position of said screen relative to said supporting means to insure registry between the lines of the screen and slide.

DUDLEY MILBANK FEGAN.